(12) United States Patent
Lev

(10) Patent No.: US 12,230,006 B2
(45) Date of Patent: Feb. 18, 2025

(54) REMOVAL OF ARTIFACTS FROM IMAGES CAPTURED BY SENSORS

(71) Applicant: NEC Corporation Of America, Herzlia (IL)

(72) Inventor: Tsvi Lev, Tel-Aviv (IL)

(73) Assignee: NEC Corporation Of America, Herzlia (IL)

(*) Notice: Subject to any disclaimer, the term of this patent is extended or adjusted under 35 U.S.C. 154(b) by 441 days.

(21) Appl. No.: 17/573,780

(22) Filed: Jan. 12, 2022

(65) Prior Publication Data
US 2023/0222761 A1 Jul. 13, 2023

(51) Int. Cl.
G06V 10/60 (2022.01)
G06T 5/50 (2006.01)
G06T 7/11 (2017.01)
G06T 7/70 (2017.01)
G06V 10/50 (2022.01)
G06V 10/62 (2022.01)

(52) U.S. Cl.
CPC ............ *G06V 10/62* (2022.01); *G06T 5/50* (2013.01); *G06T 7/11* (2017.01); *G06T 7/70* (2017.01); *G06V 10/50* (2022.01); *G06V 10/60* (2022.01); G06T 2207/30252 (2013.01); G06V 2201/07 (2022.01)

(58) Field of Classification Search
CPC . G06T 2207/10021; G06T 2207/20221; G06T 2207/30252; G06T 3/4038; G06T 5/50; G06T 7/11; G06T 7/70; G06V 10/50–62; G06V 2201/07; G06V 20/58; G06V 20/56; G06V 20/588; G06N 3/02–105
See application file for complete search history.

(56) References Cited

U.S. PATENT DOCUMENTS

| 9,902,322 | B2 | 2/2018 | Kuehnle et al. | |
| 10,182,225 | B1 * | 1/2019 | Cui | G06V 10/30 |
| 10,694,105 | B1 | 6/2020 | Yadav | |
| 11,479,213 | B1 * | 10/2022 | Kentley-Klay | G01S 17/931 |
| 2011/0273582 | A1 * | 11/2011 | Gayko | G06T 5/77 |
| | | | | 348/222.1 |

(Continued)

FOREIGN PATENT DOCUMENTS

| CN | 110148181 A * | 8/2019 | |
| EP | 2293588 A1 * | 3/2011 | B60R 1/00 |
| WO | WO 2019/201512 | 10/2019 | |

*Primary Examiner* — Emily C Terrell
*Assistant Examiner* — Stefano Anthony Dardano

(57) ABSTRACT

There is provided a vehicle sensor system, comprising: a plurality of sensors with mostly overlapping field of views that simultaneously acquire temporary images, a processing circuitry that: analyzes the temporary images to identify at least one blocked image area in at least one temporary image of the plurality of temporary images which is less or not blocked in at least one spatially corresponding image area of at least one other temporary image of the plurality of temporary images, selects visual data from the at least one spatially corresponding image areas over corresponding visual data from the at least one blocked images area, merges the plurality of temporary images into a final image using the selected visual data and excludes the at least one blocked image area, and an output interface that forwards the final image to a vehicle controller.

17 Claims, 9 Drawing Sheets

(56) References Cited

U.S. PATENT DOCUMENTS

| | | |
|---|---|---|
| 2015/0103172 A1 | 4/2015 | Shimizu |
| 2020/0349846 A1* | 11/2020 | Siboni .................. G06V 10/147 |
| 2021/0274105 A1 | 9/2021 | Tsutsumitake |

* cited by examiner

REMOVAL OF ARTIFACTS FROM IMAGES CAPTURED BY SENSORS

FIELD AND BACKGROUND OF THE INVENTION

The present invention, in some embodiments thereof, relates to image processing and, more specifically, but not exclusively, to systems and methods for removal of artifacts from images captured by a sensor installed on a vehicle.

Sensors installed on vehicles play an increasingly important role, from simply recording the view from the cabin (e.g., to record accidents), to automated detection and interpretation of speed signs, to automatic navigation of autonomous vehicles.

Sensors installed in a stationary manner are used, for example, for safety, security, surveillance, biometrics, and the like.

SUMMARY OF THE INVENTION

According to a first aspect, a vehicle sensor system, comprises: a plurality of sensors with mostly overlapping field of views that simultaneously acquire temporary images, a processing circuitry that: analyzes the temporary images to identify at least one blocked image area in at least one temporary image of the plurality of temporary images which is less or not blocked in at least one spatially corresponding image area of at least one other temporary image of the plurality of temporary images, selects visual data from the at least one spatially corresponding image areas over corresponding visual data from the at least one blocked images area, merges the plurality of temporary images into a final image using the selected visual data and excludes the at least one blocked image area, and an output interface that forwards the final image to a vehicle controller.

According to a second aspect, a method for generating an image from a vehicle sensor system, comprises: obtaining temporary images from a plurality of sensors with mostly overlapping field of views that simultaneously acquire the temporary images, analyzing the temporary images to identify at least one blocked image area in at least one temporary image of the plurality of temporary images which is less or not blocked in at least one spatially corresponding image area of at least one other temporary image of the plurality of temporary images, selecting visual data from the at least one spatially corresponding image areas over corresponding visual data from the at least one blocked images area, merging the plurality of temporary images into a final image using the selected visual data and excludes the at least one blocked image area, and forwarding the final image to a vehicle controller.

According to a third aspect, a sensor system, comprises: a plurality of sensors with mostly overlapping field of views that simultaneously acquire temporary images, a processing circuitry that: analyzes the temporary images to identify at least one blocked image area in at least one temporary image of the plurality of temporary images which is less or not blocked in at least one spatially corresponding image area of at least one other temporary image of the plurality of temporary images, selects visual data from the at least one spatially corresponding image areas over corresponding visual data from the at least one blocked images area, merges the plurality of temporary images into a final image using the selected visual data and excludes the at least one blocked image area, and an output interface that forwards the final image to a controller selected from a group comprising: surveillance, biometric, and security.

In a further implementation form of the first, second, and third aspects, the processing circuitry: identifies the at least one blocked image area, by accessing a dataset that maps between pixels of a first sensor and corresponding field-of-view corrected pixels in a second sensor, that depict a same region of the overlapping field of views, computes, for the first sensor, a first difference between a first image patch around a first pixel(s) of the temporary image acquired by the first sensor, and a corresponding first image patch around the first pixel(s) of at least one preceding temporary image acquired by the first sensor, computes, for the second sensor, a second difference between a second image patch around the FOV corrected pixel(s) of the temporary image acquired by the second sensor corresponding to the first pixel(s) of the temporary image acquired by the first sensor, and a corresponding second image patch around the FOV corrected pixel(s) of at least one preceding temporary image acquired by the second sensor, and when the first difference and the second difference are substantially different, identifying at least one blocked image area as the first image patch or the second image patch.

In a further implementation form of the first, second, and third aspects, at least one of: (i) the corresponding first image patch and corresponding second image patch, and (ii) the first image patch and the second image patch, are computed by applying a compensation for motion of the vehicle and/or motion of the sensor.

In a further implementation form of the first, second, and third aspects, the identified at least one blocked image area comprises at least one moving object that moves independently with respect to the moving vehicle and/or sensors.

In a further implementation form of the first, second, and third aspects, identifying the at least one blocked image area comprises identifying the at least one blocked image area as the first image patch when the first difference is larger, or identifying the at least one blocked image area as the second image patch when the second difference is larger.

In a further implementation form of the first, second, and third aspects, the at least one blocked image area is identified when at least one of the first difference and the second difference is maintained for at least a threshold number of frames.

In a further implementation form of the first, second, and third aspects, the at least one blocked image area comprises an object that is stationary with respect to motion of the vehicle.

In a further implementation form of the first, second, and third aspects, the object that is stationary with respect to motion of the vehicle is located on at least one of: (i) one of the sensors, and (ii) a windshield of the vehicle when the sensors are installed in an interior of the vehicle.

In a further implementation form of the first, second, and third aspects, identifying the at least one blocked image area comprises identifying the at least one blocked image area as the first image patch when recent historical values of the first difference have become smaller over time and/or when a current value of the first difference is significantly different from at least one recent historical value of the first difference, or identifying the at least one blocked image area as the second image patch when recent historical values of the second difference have become smaller over time and/or when a current value of the second difference is significantly different from at least one recent historical value of the second difference.

In a further implementation form of the first, second, and third aspects, the first difference is computed by a first cross correlation between the first image patch and the corresponding first image patch, and the second difference is computed by a second cross correlation between the second image patch and the corresponding second image patch.

In a further implementation form of the first, second, and third aspects, at least one of the first difference and the second difference is selected from a group consisting of: a change in pixel luminosity, and a change in pixel sharpness.

In a further implementation form of the first, second, and third aspects, the processing circuitry: identifies the at least one blocked image area, by computing a plurality of features for each one of the temporary images, matching the plurality of features between the plurality of temporary images, computing a distance between each matched features, and identifying the at least one blocked image area as at least one feature having a distance above a threshold, wherein the threshold is selected to indicate a closest distance to the sensors that separates between a blocking object and a field of view target object.

In a further implementation form of the first, second, and third aspects, the processing circuitry: identifies the at least one blocked image area, by feeding each one of the plurality of temporary images into a machine learning model to obtain an outcome of a segmentation of the at least one blocked image area, wherein the machine learning model is trained on a training dataset of sample images captured by sensors, with segmentations/boundary boxes enclosing blocked images areas labelled as ground truth.

In a further implementation form of the first, second, and third aspects, further comprising feeding at least the at least one blocked image area into a trained machine learning model for verifying that the at least one blocked image area is due to undesired objects and not due to significant objects.

In a further implementation form of the first, second, and third aspects, the vehicle controller comprises an ADAS.

In a further implementation form of the first, second, and third aspects, in response to receiving the final image, the vehicle controller performs at least one of: automatic braking, automatic steering, automatic navigation, automatic acceleration, automatic change in speed, generates an alert message, and updating of a heads up display.

In a further implementation form of the first, second, and third aspects, the plurality of sensors are positioned on the vehicle, or within an interior of the vehicle, spaced apart and oriented for providing a significant parallax for undesired objects located on a windshield or in near proximity to the vehicle, the undesired objects depicted as the at least one blocked image area.

In a further implementation form of the first, second, and third aspects, the plurality of sensors are spaced apart and orientated for insignificant parallax for target objects located further away from the vehicle that are not depicted as the at least one blocked image area, wherein the final image created by the processing circuitry depicts the target objects and excludes the undesired objects, wherein a distance between sensors is significantly larger than a distance between any one of the sensors and target objects.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
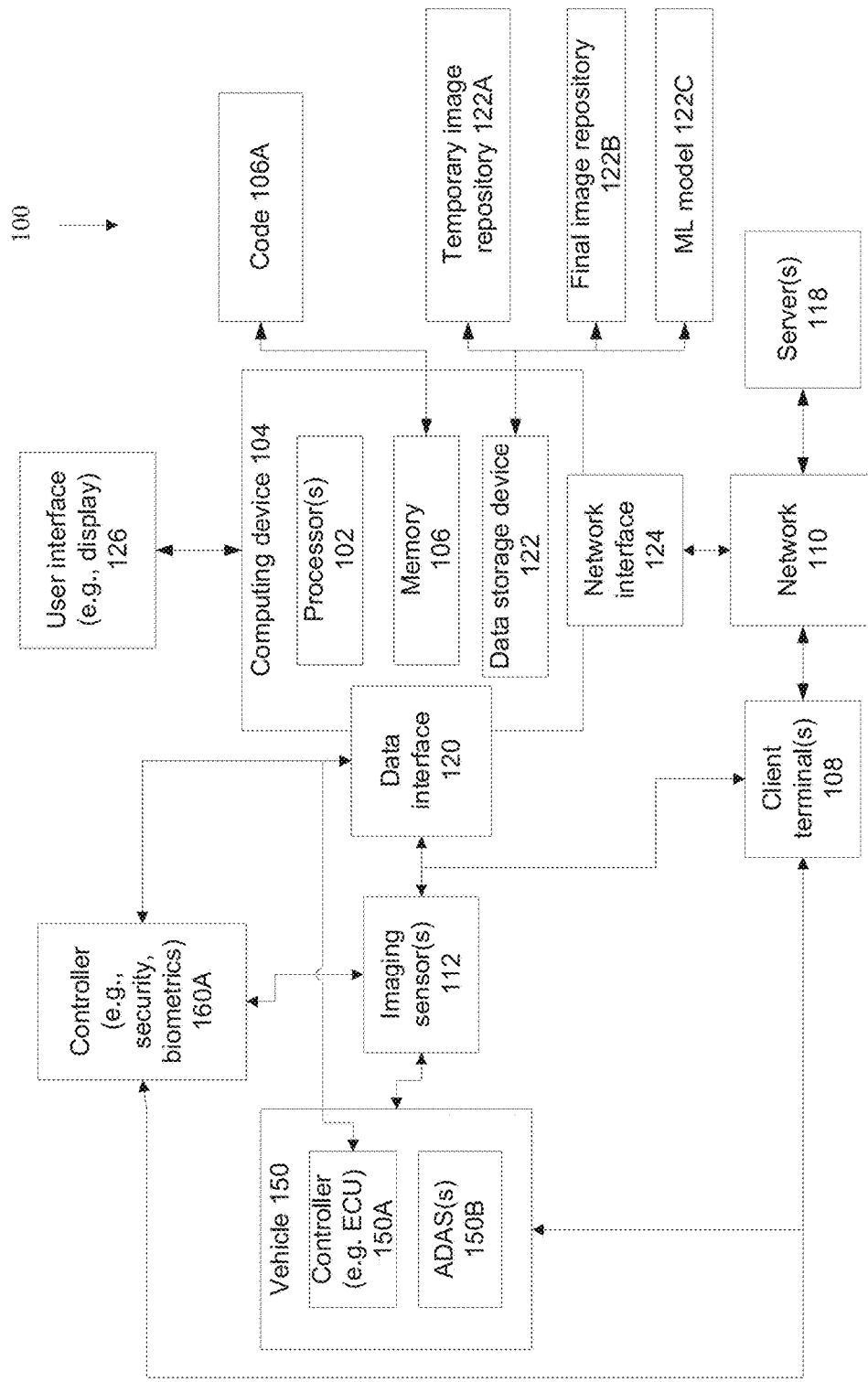
FIG. 1 is a block diagram of components of a system for removing blocked image areas from a final image created from temporary images acquired by sensors, in accordance with some embodiments of the present invention.

The present invention, in some embodiments thereof, relates to image processing and, more specifically, but not exclusively, to systems and methods for removal of artifacts from images captured by sensors.

An aspect of some embodiments of the present invention relate to systems, methods, devices, and code instructions (stored on a memory and executable by one or more hardware processors and/or implemented as circuitry) for removing blocked image area(s) from images captured by sensors. The sensors may be installed on a vehicle designed to move, for example, a car driven by a human, a self-driving car, an autonomous drone, and a robot. Alternatively or additionally, the sensors may be installed in a stationary manner, for example, a security camera, a surveillance camera, a safety camera, and a biometrics camera. The blocked image area may be due to object(s) that are stationary with respect to the sensors and/or to the vehicle when sensors are installed, for example, dirt on the sensor, dirt on the windshield, and a scratch/damage to the lens of sensor and/or windshield. Alternatively or additionally, the blocked image area may be due to object(s) that are independently moving with respect to the sensors and/or to the vehicle when sensors are installed, for example, snow, rail, leaves, and objects flying in the wind. Two or more sensors, with mostly overlapping field of views, simultaneously acquire temporary images. The sensors are set to depict images of a scene of interest, for example, depicting the road and road-side in front of the moving vehicle, and/or a geographical region being monitored for security, and/or a defined location where a body part is placed for biometric analysis. The temporary images are analyzed to identify one or more blocked image area in one or more of the temporary images. The blocked images area(s) are less or not blocked in one or more spatially corresponding image area of other temporary image(s). In an example, the temporary images depict a scene of a street in front of the vehicle. In a first image, a street sign is blocked by mud on the windshield, while a street light is unblocked. On a second image, due to the parallax and/or physical distance between the sensors, the street sign is visible, but the mud on the windshield blocks the street light. Visual data is selected from the spatially corresponding image area(s) over corresponding visual data from the blocked images area(s). For example, the street light is selected over the mud from the first image, and the street sign is selected over the mud from the second image. The temporary image(s) are merged into a final image using the selected visual data and excluding the corresponding visual data. For example, the first and second images are merged, to exclude the mud and include the street sign and street light. In implementations where the sensors are installed on a vehicle, the final image may be forwarded to a vehicle controller, for example, an ECU that controllers an advanced driver assistance system (ADAS) Eliminating or reducing the blocked areas from the final image reduces errors of the vehicle controller, for example, the vehicle controller does not brake suddenly due to a piece of paper temporarily getting stuck on the windshield. In other implementations where the sensors are fixed and/or stationary, the final image may be forwarded to a controller, for example, a surveillance controller that generates a surveillance alert when a suspicious object/activity is detected, a security controller that activates a security feature when a security alert is detected, and a biometric controller that opens a door when a validated person is detected.

At least some implementations of the systems, methods, devices, and/or code instructions described herein address the technical problem of removing one or more blocked image regions from an image. The blocked image region(s) may be due to objects that are stationary with respect to the sensors (e.g., mud, scratch). Alternatively or additionally, the blocked image region(s) may be due to objects that are moving independently of the sensors (e.g., snow, rain, leaves). The blocked image region(s) regions may appear in multiple temporary images acquired by multiple sensors. Alternatively or additionally, the blocked image region(s) may be depicted in a single temporary image acquired by a single sensor, and not be depicted in other temporary image (s) acquired by another sensor(s). At least some implementations of the systems, methods, devices, and/or code instructions described herein improve the technical field of image analysis, by removing one or more blocked image regions from an image.

The above mentioned technical problems are addressed, and/or the above mentioned technical fields are improved, by identifying blocked image area(s) in one or more temporary images captured by sensors. The blocked image area(s) is less or not blocked in one or more spatially corresponding image area(s) of one or more other temporary image(s). Visual data from the spatially corresponding image areas, which is unblocked, is selected over corresponding visual data from the blocked images area. The temporary images are merged into a final image using the selected visual data which depicts the non-blocked image area and excluding the corresponding visual data which depicts the blocked image area. The final image excludes blocked image areas, and which depicts objects which would otherwise be non visible due to the blocked images areas.

At least some implementations of the systems, methods, devices, and/or code instructions described herein address the technical problem of increasing accuracy of a controller such a vehicle controller (e.g., an ECU and/or ADAS) and/or another controller (e.g., security controller, biometrics controller, surveillance controller). At least some implementations of the systems, methods, devices, and/or code instructions described herein improve the technical field of vehicle controllers, by increasing the accuracy of the vehicle controller.

In implementations where the sensors are stationary, the blocked image region(s) may reduce accuracy of a controller that analyzes the images to trigger other actions. For example, a muddy drop falls on a sensor connected to a biometric controller. This leads to distortion of images collected for biometric based entry to a building. The biometric controller may incorrectly determine that a valid individual is not recognized, and fail to automatically open a door to let the individual into the building. In another example, a page of a newspaper that includes a picture of a person flies close to a security sensors connected to a security controller. The security controller triggers a security alert based on the incorrect interpretation of the picture as a real person that poses a security threat to a premises.

In implementations where the sensors are installed on a vehicle, the blocked image region(s) may reduce accuracy of a vehicle controller that analyzes images captured by sensor (s), for example, an ECU and/or ADAS system that may incorrectly interpret the blocked image region as a significant object. For example, a page of a newspaper that includes a picture of a person flies on the windshield, and the ADAS triggers automatic braking in response to an incorrect interpretation of the picture as a real person. In another example, the blocked image region may block a significant object that the ECU and/or ADAS system analyses, for example, mud on the windshield blocks a street light, and the ADAS cannot tell whether the street light is red or green.

ADAS may refer to systems designed to help the driver drive better, by increasing road safety and/or car safety. ADAS may be designed with the goal of reducing human error of the driver. ADAS may automate some driving tasks, may adapt some driving tasks, and/or may enhance some driving tasks. For example, ADAS may generate alerts to the driver warning of a dangerous scenario likely to result in an adverse event, for example, vehicle drifting out of its lane, pedestrians crossing the street, and a distance to the car ahead is too close. ADAS may perform automated tasks when a dangerous scenario is automatically detected, for example, automated braking when the distance to the car ahead is decreasing, and automated steering of the vehicle to avoid a collision. Other ADAS systems may attempt to increase safety, for example, by automatically turning on lights, automatically turning on windshield wipers, monitoring blind spots, and rear view cameras.

ADAS may include an Autonomous Driving System (ADS). As used herein, the terms ADAS and ADS may sometimes be interchanged. The vehicle may be fully automated, semi-automated, and/or driven by a human driver with ADAS.

The above mentioned technical problems are addressed, and/or the above mentioned technical fields are improved, by feeding the final image to the controller. The accuracy of the controller is increased by using the final image that excludes blocked image areas, and which depicts objects which would otherwise be non visible due to the blocked images areas. Errors of the controller arising from otherwise blocked image areas are reduced or eliminated.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
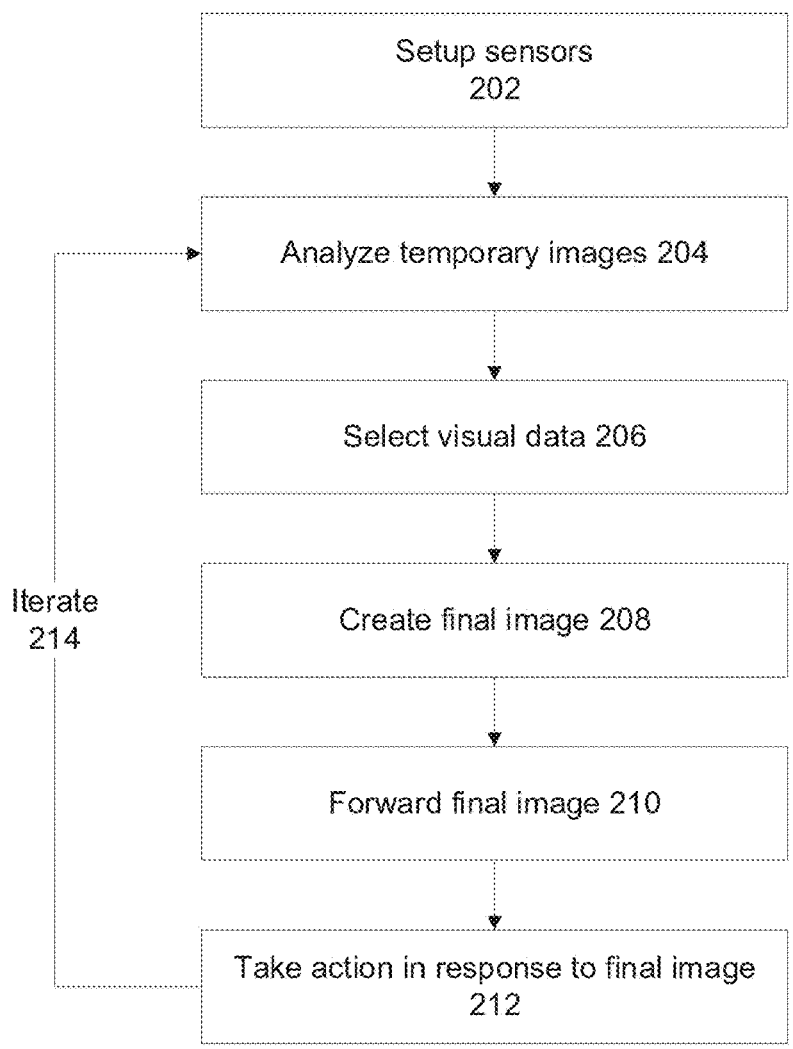
FIG. 2 is a flowchart of a method removing blocked image areas from a final image created from temporary images acquired by sensors, in accordance with some embodiments of the present invention.
Figure 3:
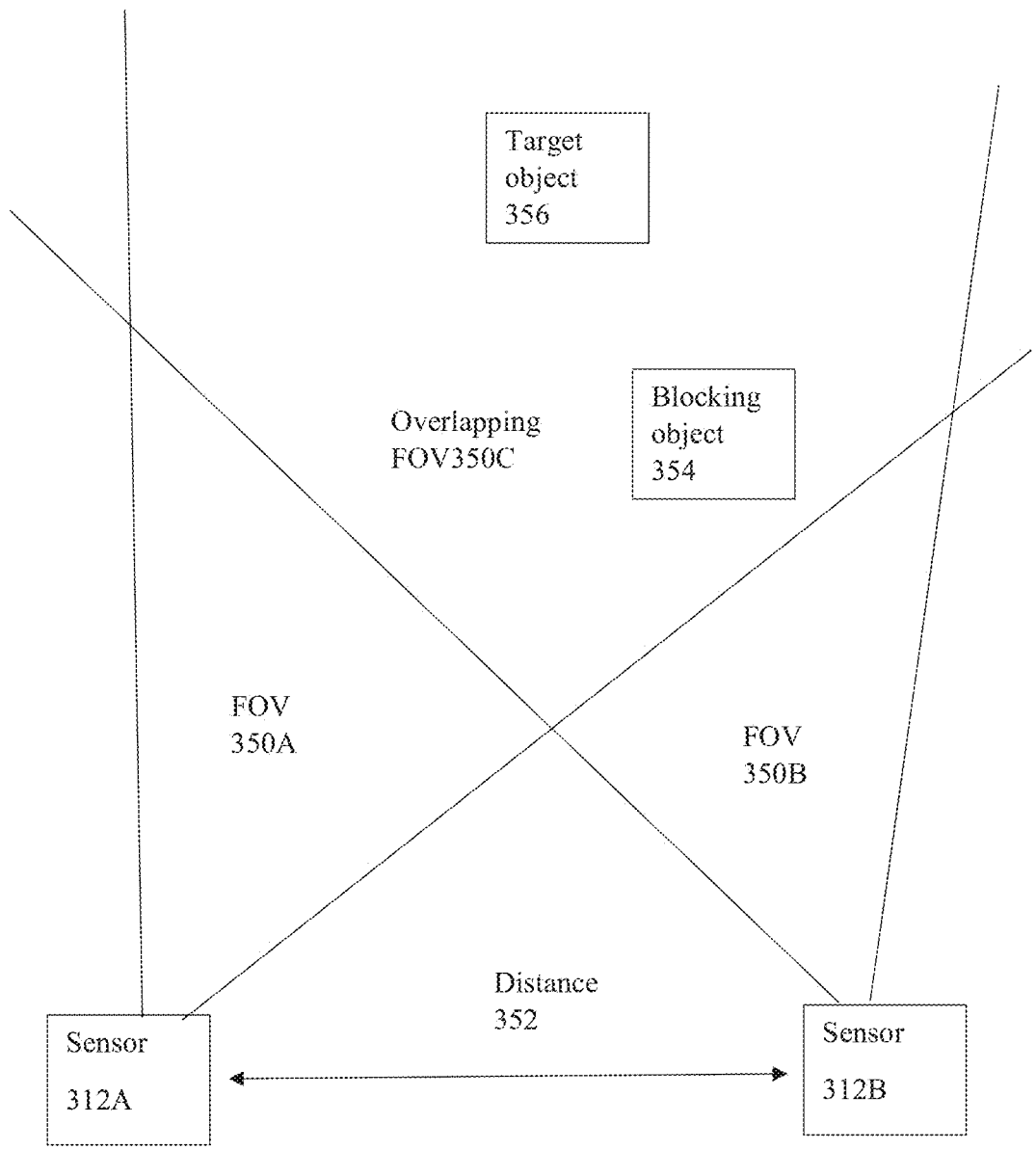
FIG. 3 depicts an exemplary setup of sensors, in accordance with some embodiments of the present invention.
Figure 4:
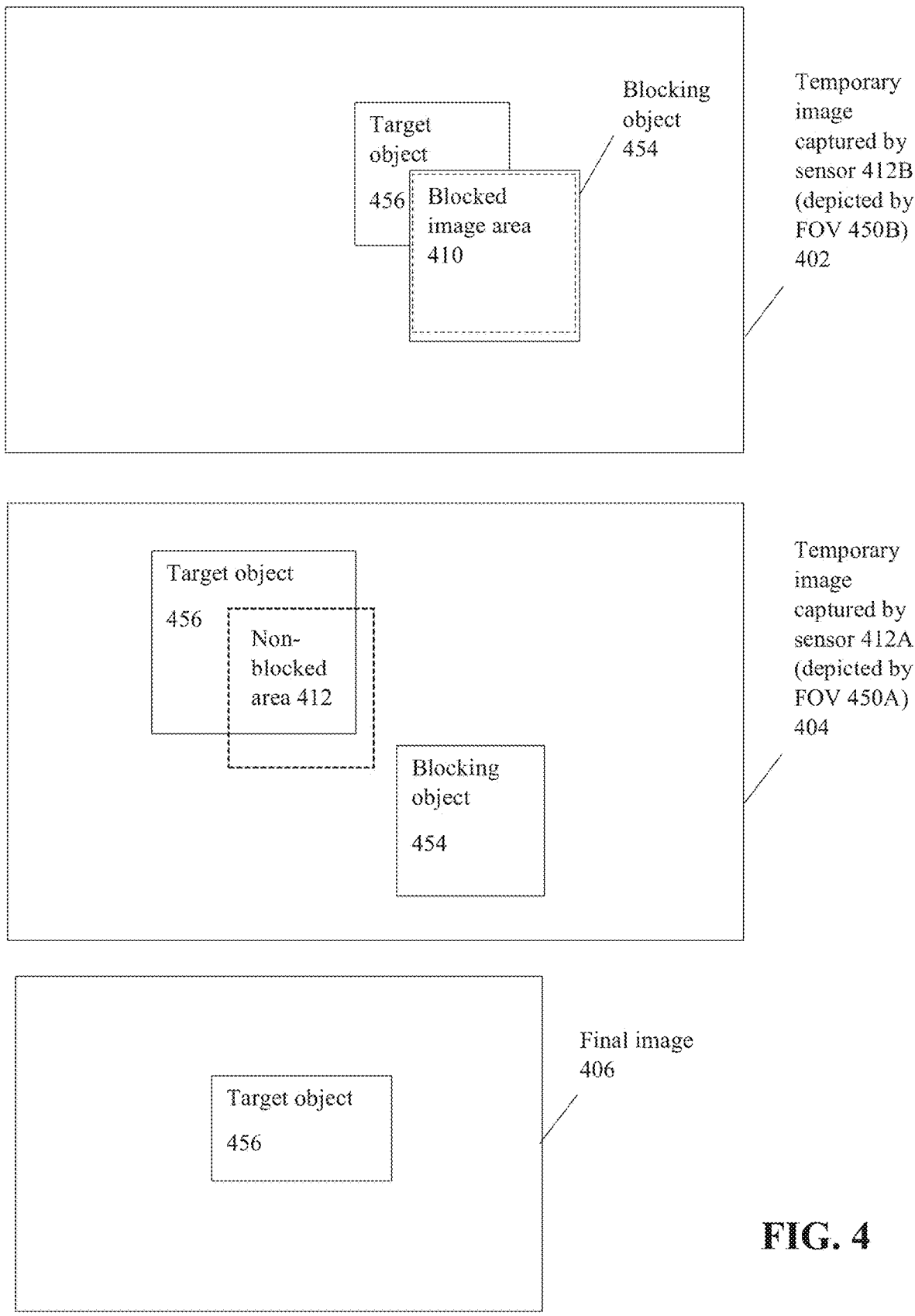
FIG. 4 is a schematic depicting examples of temporary images and creation of a final image, in accordance with some embodiments of the present invention.

Reference is now made to FIG. 1, which is a block diagram of components of a system 100 for removing blocked image areas from a final image created from temporary images acquired by sensors 112, in accordance with some embodiments of the present invention. Reference is also made to FIG. 2, which is a flowchart of a method removing blocked image areas from a final image created from temporary images acquired by sensors, in accordance with some embodiments of the present invention. Reference is also made to FIG. 3, which depicts an exemplary setup of sensors 312A-B, in accordance with some embodiments of the present invention. Reference is now made to FIG. 4, which is a schematic depicting examples of temporary images 402 404 and creation of a final image 406, in accordance with some embodiments of the present invention. Reference is also made to FIGS. 5-9, which are schematics depicting an experiment performed by Inventors to evaluate detection of blocking objects, in accordance with some embodiments of the present invention.

System 100 may implement the acts of the method described with reference to FIGS. 1-9, optionally by a hardware processor(s) 102 of a computing device 104 executing code instructions 106A stored in a memory 106.

The term processor is used interchangeably with the term circuitry. In some embodiments, processor 102 and memory 106 may be substituted with, and/or used with, circuitry that implements code 106A in hardware.

Computing device 104 receives temporary images from sensors 112, computes a final images from the temporary image, and feeds the final image, for example, to a vehicle controller 150A and/or to another controller 160A, as described herein.

Computing device 104 may be implemented as, for example, one or more and/or combination of: a group of connected devices, a client terminal, a server, a computing device installed within vehicle 150 (e.g., vehicle controller 150A, a vehicle ECU, a client device connected to a vehicle network, code installed on an existing vehicle computing component), installed within controller 160A (e.g., security system, biometric system), a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Computing device 104 may be implemented as a component installed within vehicle 150, for example, a dedicated component of vehicle controller 150A and/or vehicle ECU, a client device connected to a vehicle network (e.g., directly connected via a cable connected, and/or connected via a temporary wireless network), and/or code installed on an existing vehicle computing component.

Controller 150A of vehicle 150 may control components that may be adapted and/or controlled according to an analysis of the final images (e.g., detected objects), for example, for automatic control of the vehicle.

Computing device 104 may be implemented as a component installed within controller 160A, which may a security system, a surveillance system, a biometric system, and the like. For example, a dedicated component of controller 160A, a client device connected to a security and/or biometric network (e.g., directly connected via a cable connected, and/or connected via a temporary wireless network), and/or code installed on an existing computing component.

Controller 160A may control components that may be adapted and/or controlled according to an analysis of the final images (e.g., detected objects), for example, for automatic triggering of a security alert, automatic opening of a door, automatic trigger of a surveillance robot, and the like.

In a localized implementation, computing device 104 and client terminal 108 may be the same device.

In an example of a central server based implementation, computing device 104 may include locally stored software that performs one or more of the acts described with reference to FIGS. 2-9, and/or may act as one or more servers (e.g., network server, web server, a computing cloud, virtual server) that receives images and/or other sensor data from one or more client terminals 108 (e.g., local computers associated with different vehicles, such as autonomous vehicles) and/or provides services (e.g., one or more of the acts described with reference to FIGS. 2-9 to one or more client terminals 108 over a network 110, for example, client terminals 108 which may be associated with vehicle(s) 150 for establishing a communication session with computing device 104, and/or client terminals 108 providing images to computing device 104.

The client terminal 108 may provide temporary images from imaging sensor(s) to computing device 104.

In some implementations, client terminal 108 may be associated with vehicle 150, for example, as an onboard computer, an ECU, and/or a mobile device forming a temporary wireless and/or wired connection with vehicle 150. Vehicle 150 has imaging sensor(s) 112 installed thereon, for example, a camera, an onboard cameras, a dashboard camera, onboard sensors, attachable sensors, and the like. Images may be captured by imaging sensor(s) 112 of vehicle 150 while vehicle 150 is driving, such as being driven by a human driver and/or automatically driven.

In some implementations, client terminal 108 may be associated with controller 160A, for example, client terminal is a security server and/or biometric server and/or surveillance server running code that performs features of the controller. Sensors 112 may be installed in a stationary manner, for example, within a building, on walls, and/or in doors. Images captured by sensors 112 are forwarded to controller 160, for example, for biometric based access to a building, for monitoring a premises, and/or for security monitoring.

Computing device 104 may provide, for example, software as a service (SaaS) to the client terminal(s) 108, an application for local download to the client terminal(s) 108, as an add-on to a local running application, and/or functions using a remote access session to the client terminals 108, such as through a local running application.

Computing device 104 may receive the temporary images captured by imaging sensor(s) 112, for example, directly from the sensors 112, from a computer running on vehicle 150, from a client terminal 108 connected to vehicle 150 and to the sensors, from controller 160A connected to imaging sensor(s) 112, from client terminal(s) 108 connected to controller 160A, and/or via an image repository such as server 118 (e.g., PACS server, cloud storage, hard disk) where images and/or other sensor data are first uploaded by client terminal 108 and/or vehicle 150 and/or sensors 112.

Exemplary imaging sensor(s) 112 include: a still camera, a stereo camera, a video camera, a 2D sensor, a 3D sensor, a color sensor, a black and white sensor, standard visible light sensors (e.g., CCD, CMOS sensors, and/or red green blue (RGB) sensor), short-wave infrared (SWIR) sensors, and near infrared (NIR) sensors, and LIDAR sensor.

Temporary images captured by imaging sensor(s) 112 may be stored in a temporary image repository 122A, which may be stored on a data storage device 122 accessible by computing device 104. This enables analysis of preceding temporary images in comparison to current temporary images, as described herein.

Final images computed by the computing device 104 may be stored in a final image repository 122B, optionally on data storage device 122.

Computing device 104 may receive the temporary images from imaging sensor(s) 112 using one or more data interfaces 120, for example, a wire connection (e.g., physical port), a wireless connection (e.g., antenna), a local bus, a port for connection of a data storage device, a network interface card, other physical interface implementations, and/or virtual interfaces (e.g., software interface, virtual private network (VPN) connection, application programming interface (API), software development kit (SDK)). Alternatively or additionally, Computing device 104 may receive the images from client terminal(s) 108.

Hardware processor(s) 102 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include one or more processors (homogenous or heterogeneous), which may be arranged for parallel processing, as clusters and/or as one or more multi core processing units.

Memory 106 (also referred to herein as a program store, and/or data storage device) stores code instruction for execution by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more acts and/or features of the method described with reference to FIGS. 2-9.

Computing device 104 may include a data storage device 122 for storing data, for example, temporary image repository 122A, final image repository 122B and/or machine learning (ML) model 122C which may be used to verify that the blocked image areas being removed represent undesired objects, as described herein. Data storage device 122 may be implemented as, for example, a memory, a local hard-drive, a removable storage device, an optical disk, a storage device, and/or as a remote server and/or computing cloud (e.g., accessed over network 110). It is noted that execution code portions of the data stored in data storage device 122 may be loaded into memory 106 for execution by processor(s) 102.

Exemplary implementations of machine learning model (s) described herein (e.g., 122C) include: a classifier, a statistical classifier, one or more neural networks of various architectures (e.g., convolutional, fully connected, deep, encoder-decoder, recurrent, graph, combination of multiple architectures), support vector machines (SVM), logistic regression, k-nearest neighbor, decision trees, boosting, random forest, a regressor and the like. The ML model(s) may be trained using supervised approaches and/or unsupervised approaches.

Computing device 104 may include data interface 124, optionally a network interface, for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 104 may access one or more remote servers 118 using network 110, for example, to download updated versions of machine learning model(s) 122C, and/or code 106A. Computing device 104 may communicate using network 110 (or another communication channel, such as through a direct link (e.g., cable, wireless) and/or indirect link (e.g., via an intermediary computing device such as a server, and/or via a storage device) with one or more of:

Vehicle 150, for example, to receive temporary images captured by imaging sensor(s) 112 and/or to provide the computed final image.

Controller 160A, for example, to receive temporary images captured by imaging sensor(s) 112 and/or to provide the computed final image.

Client terminal(s) 108, for example, associated with vehicle 150.

Server 118, which may store updates of code 106A and/or ML model 122C.

It is noted that imaging interface 120 and data interface 124 may exist as two independent interfaces (e.g., two network ports), as two virtual interfaces on a common physical interface (e.g., virtual networks on a common network port), and/or integrated into a single interface (e.g., network interface).

Computing device 104 and/or client terminal 108 includes or is in communication with a user interface 126 that includes a mechanism designed for a user to enter data and/or view data. Exemplary user interfaces 126 include, for example, one or more of, a touchscreen, a microscope, a display, a keyboard, a mouse, and voice activated software using speakers and microphone.

Referring now back to FIG. 2, at 202, sensors are set-up. The sensors may be installed in the vehicle (and/or other moving object). The sensors may be installed in a stationary manner, for example, within a building, on walls, and/or in doors. The sensors are synchronized to capture images substantially simultaneously, for example, the time difference between capture of images by the different sensors is smaller than the actual imaging/exposure time.

The sensors may be calibrated. Calibration may be performed by computing a mapping dataset that maps pixels of images captured by a first sensor to pixels of images captured by a second sensor. The mapped pixels of the images depict a same location in the real world. An exemplary calibration process is now described. A scene of a road depicted in two images captured by two sensors. Features are identified in each of the images, and the same features are matched to one another. A transformation and/or mapping dataset (e.g., matrix, function) is computed for mapping between pixels of the two images. The mapping enables identifying spatially corresponding image areas between the two images, for finding the non-blocked image regions of one image that correspond to blocked image regions of the other image, as described herein.

The mapping dataset maps between pixels of a first sensor and corresponding field-of-view corrected pixels in a second sensor, that depict a same region of the overlapping field of views.

Referring now back to FIG. 3, sensors 312A and 312B may be positioned on the vehicle, and/or within an interior of the vehicle (e.g., within the cabin of the vehicle). The sensors 312A-B may be positioned to face forward, capturing images depicting the road scene in the direction in which the vehicle is driving. It is noted that sensors 312A-B may be positioned to face backwards, and/or sideways, for example for capturing images depicting the road scene when the vehicle is moving backwards, and/or when the vehicle turns left or right (while moving forward or backwards, or moves left or right such as during automated parallel parking).

Alternatively, sensors 312A-B are installed in a stationary manner, for example, within a building, on walls, and/or in doors. Sensors 312A-B may be positioned to monitor a premises, such as a front of a building. Sensors 312A-B may be positioned to capture images for biometric analysis, for example, a camera on a door that captures images of faces of individuals, and opens the door for recognized validated individuals.

Sensor 312A captures images depicting a field of view (FOV) 350A, and sensor 312B captures images depicting a field of view (FOV) 350B.

Sensors 312A-B are spaced apart with a distance 352, and are oriented, such that FOV 350A and FOV 350B significantly overlap in a FOV 350C, for example, at least 50% overlap, or at least 60%, 70%, 80%, 90%, 95% overlap, or other values.

Sensors 312A-B are positioned such that distance between the sensors 352 is much smaller than an expected distance to desired target object(s) 356. Distance between the sensors 352 is not significantly smaller and/or not significantly larger than an expected distance to undesired blocking object(s) 354. This positioning of sensors 312A-B creates a large parallax for blocking object(s) 354 and a relatively small or insignificant parallax for target object(s) 356. The parallax setup enables removal of the blocked image area(s) indicated by the blocking object(s) 354, by replacement with visible data. The final image that depicts target object 356 and excludes blocking object 354 is created, as described herein.

Blocking object 354 may be located on a windshield or in near proximity to the vehicle and/or sensor 312A and/or 312B. Blocking object 354 may be stationary (e.g., mud, crack in glass, water), and/or moving (E.g., rain, leaves, snow, paper blowing in wind).

Target object 356 may be a significant object that is analyzed by the controller (E.g., ADAS, ECU), for example, another vehicle, a pedestrian, a street sign, a speed limit sign, and a traffic light. In another example, target object 356 is analyzed by the controller (e.g., security, biometric, surveillance) to determine whether the object is a security threat, a suspicious object, and/or a validated object, such as a human.

It is noted that there may be two or more sensors. Two sensors are shown as a not necessarily limiting example. An increase in the number of sensors reduces likelihood of having blocked image areas in all images without spatially corresponding non-blocked areas, increasing likelihood of being able to generate a final image with no image blocked areas. For example, the chances of objects attaching to the imaging windows in the same spots, or that of objects in the air blocking the same angular direction in space, are much lower, and decrease the greater the number of sensors. As an example, when dirt/water drops block 10% of the effective FOV of a single imaging device, and are randomly distributed (uncorrelated), then the chance of a single point in the FOV being blocked by particles by the merge of two images is ~1%.

At 204, the temporary images are analyzed to identify one or more blocked image areas in one or more of the temporary images, which are less or not blocked in one or more spatially corresponding image area of at least one other temporary image.

The spatially corresponding image area may be found using the mapping dataset that maps between pixels of a first sensor and corresponding field-of-view corrected pixels in a second sensor, that depict a same region of the overlapping field of views, as described herein.

Optionally, the blocked image areas may be in two or more temporary images, for example, in two images acquired by two sensors. Such a case may occur when a blocking object is located within the overlapping FOV of the two sensors, for example, located externally and a distance from the sensors and/or vehicle, for example, snow, papers flying, and rain. In such a case, different blocked images area may be identified in each of the images. The corresponding images areas which are less or not blocked are found in the other images.

Alternatively, the blocked image areas may be in one of the temporary images but not in the other temporary image, for example, in one of two images acquired by two sensors. Such a case may occur when a blocking object is located within the FOV of one sensor, but not within the FOV of the other sensor. For example, the blocking object is located on the lens of the sensor and/or on the windshield in close proximity to the sensor, for example, mud and/or a crack in the glass. The corresponding images area which is less or not blocked is found in the other image.

Referring now back to FIG. 4, temporary image 402 is captured by a sensor 412B, having FOV 450B, for example, sensor 312B having FOV 350B, as described with reference to FIG. 3.

Temporary image 404 is captured by a sensor 412A, having FOV 450A, for example, sensor 312A having FOV 350A, as described with reference to FIG. 3.

FOV 450A and FOV 450B mostly overlap. Sensors 412A and 412B are positioned for significant (or large) parallax for objects located in proximity to the sensors, and non-significant or much smaller parallax for objects a distance from the sensors that is much larger than the distance between the sensors, for example, as described with reference to FIG. 3.

Temporary image 402 depicts a blocking object 454, which at least partially blocks a target object 456 by a blocked image area 410. Target object 456 may correspond to target object 356 described with reference to FIG. 3. Blocking object 454 may correspond to blocking object 354 described with reference to FIG. 3.

Temporary image 404 depicts blocking object 454, which does not block target object 456. Target object 456, and other background which is blocked by blocked image area 410 of temporary image 402, is visible in non-blocked area 412. Non-blocked image area 412 of temporary image 404 spatially corresponds to blocked image area 410 of temporary image 402.

Non-blocked image area 412 is also referred to herein as visual data.

A final image 406 is created by merging temporary images 402 and 404 using the selected visual data of non-blocked image area 412, and by excluding the blocked image area 410. Final image 406 may fully visually depict target object 456 and exclude object 454.

It is noted that the create final image 406 where blocking object 454 is absent, the blocked image area created by blocking object 454 in temporary image 404 is identified, and the visual data in the corresponding non-blocked image area in temporary image 402 is used.

Referring now back to 204 of FIG. 2, an exemplary approach is now described for identifying the blocked image area(s). For clarity and simplicity of explanation, the simple case of two sensors is described. It is to be understood that the approach for two sensors is extendable for three or more sensors.

For the first sensor, a first difference between a first image patch around a first pixel(s) of the temporary image acquired by the first sensor, and a corresponding first image patch around the first pixel(s) of one or more preceding temporary image(s) acquired by the same first sensor, is computed. The difference may be computed for patches around each one of the pixels of the temporary image, for patches around spaced apart pixels of the temporary image, and/or around pixels suspected to be blocked image areas. For example, patches may be tiled over the image, overlapping, adjacent with contact between neighboring pixels, and/or may be spaced apart. Pixels may be in the center of the patches. Patches may be selected according to an expected size of blocked image areas, for example, size of rain drops, size of snow flakes, size of paper flying, and size of mud spots. Suspected pixels may be found, for example, by an analysis of the image, such as feature extraction and matching to known features of blocking objects and/or feeding into a trained machine learning model trained to detect blocking objects. Alternatively, no suspected pixels are identified, and multiple different pixels are evaluated. The preceding temporary images may include one or more images, captured, for example, previous frame, captured in the last 0.5-1 second, captured in the last 0.1-5 seconds, or other values, for example, based on the speed at which the sensor and/or vehicle is moving such that the difference between the current image and preceding image for background objects is not very large.

For the second sensor, a second difference between a second image patch around the FOV corrected pixel(s) of the temporary image acquired by the second sensor corresponding to the first pixel(s) of the temporary image acquired by the first sensor, and a corresponding second image patch around the FOV corrected pixel(s) of at least one preceding temporary image acquired by the second sensor, is computed. The computation for the second sensor is done as described for the first sensor.

The first difference may be computed by a first cross correlation between the first image patch and the corresponding first image patch. A cross correlation value below a threshold may indicate that the first image patch and the corresponding first image patch are significantly different. The second difference may be computed by a second cross correlation between the second image patch and the corresponding second image patch. A cross correlation value below a threshold may indicate that the second image patch and the corresponding second image patch are significantly different.

The first difference and/or the second difference may be, for example, a change in pixel luminosity (e.g., color and/or intensity), and/or a change in pixel sharpness.

A compensation for motion of the vehicle and/or motion of the sensor may be applied to the corresponding first image patch and corresponding second image patch. Alternatively, the compensation for motion of the vehicle and/or motion of the sensor may be applied to the first image patch and the second image patch. The speed and/or direction for compensation of the motion may be obtained, for example, from a global positioning system (GPS) such as installed within the vehicle and/or from a smartphone, and/or from data outputted by sensors within the vehicle.

It is noted that in the case of sensors installed in a stationary manner, no compensation of motion is applied.

When the first difference and/or the second difference are substantially different, the blocked image area is identified as the first image patch and/or the second image patch, as follows.

Different approaches may be applied for detecting a moving object(s) and a stationary object. The moving object moves independently with respect to the moving vehicle and/or sensors. Examples of moving object(s) include dirt, water, rain, snow, leaves, and windshield wipers. The stationary object is stationary with respect to the vehicle and/or sensor, i.e., the stationary object moves together (i.e., synchronized) with the vehicle and/or sensor. The object that is stationary with respect to motion of the sensors and/or vehicle may located on one of the sensors, and/or on a windshield of the vehicle when the sensors are installed in an interior of the vehicle.

It is noted that both approaches may be applied to identify stationary objects and moving objects.

For the case of the moving object, the blocked image area is identified as the first image patch when the first difference is larger, or the blocked image area is identified as the second image patch when the second difference is larger. The larger difference indicates the movement of the object.

For the case of the stationary object, the blocked image area is identified when the first difference and/or the second difference is maintained for at least a threshold number of frames. The threshold may be selected, for example, according to the frame rate of the sensor(s), and/or according to the rate at which the final images are analyzes by the controller. For example a blocked image area that only lasts for 0.1 seconds may be determined to be irrelevant since such short blocking times are not determined to be significant by the controller, such as do not trigger automatic braking or affect navigation, or trigger security alerts, or other features. A blocked image are that lasts for over 0.5 seconds may be determined to be relevant, for example, triggering automatic braking and/or impacting navigation, or triggering security alerts. In such a case, the threshold may be 0.5 seconds.

Alternatively or additionally, the blocked image area is identified as the first image patch when recent historical values of the first difference have become smaller over time and/or when a current value of the first difference is significantly different from recent historical value(s) of the first difference.

Alternatively or additionally, the blocked image area is identified as the second image patch when recent historical values of the second difference have become smaller over time and/or when a current value of the second difference is significantly different from recent historical value(s) of the second difference.

Another exemplary approach for identifying the blocked image area(s) is now described. Multiple features are computed for each one of the temporary images, for example, using a feature extraction process such as scale-invariant feature transform (SIFT), speeded up robust features (SURF), and the like. The extracted features are matched between the temporary images, for example, features of the first temporary image acquired by the first sensor are matched against feature of the second temporary image acquired by the second sensor. Feature matching may be done by a feature matching process, for example, brute-force matcher, FLANN (Fast library for approximate nearest neighbors) matcher, and the like. A distance may be computed between each matched feature. The blocked image area may be computed the matched feature having a distance above a threshold. The threshold may be selected during calibration, for example, to indicate a closest distance to the sensors that separates between a blocking object and a field of view target object. Alternatively or additionally, the location of the matched feature may be compared to the mapping dataset. Matching features which are not located at corresponding mapped pixels correspond to blocked image areas. Alternatively or additionally, features found on one temporary image with no matching features on the other temporary image may be determined to correspond to blocked image areas, for example, resulting from a blocking object in the FOV of the first temporary image but not in the FOV of the second temporary image.

Another exemplary approach for identifying the blocked image area(s) is now described. Each temporary image may be fed into a trained machine learning model that generates an outcome of a segmentation/boundary box of blocked images areas. The machine learning model may be trained on a training dataset of sample images captured by sensors, with segmentations/boundary boxes enclosing blocked images areas labelled as ground truth.

Optionally, the blocked image area is verified as being due to an undesired blocking object, and not due to a significant target object. The verification may be done by feeding at least the blocked image area (e.g., which may be extracted from the temporary image) into a trained machine learning model. The outcome of the ML model may indicate whether the blocked image area is due to undesired objects and/or not due to significant objects. For example, the ML model is trained on a training dataset of images of undesired blocking objects and/or desired target objects, each labelled with a respective ground truth label.

At 206, visual data is selected from spatially corresponding image areas of the other temporary image (without the blocking image area) over corresponding visual data from the blocked images area of the temporary image (with the blocking image area).

Spatial correspondence may be determined by the mapping dataset described herein. For example, finding second pixels of a second temporary image that spatially correspond to first pixels of a first temporary image using the mapping dataset that maps between the pixels of the first and second temporary images.

For example, referring back to FIG. 4, the visual data is selected from the non-blocked image area 412 of temporary image 404. Non-blocked area 412 spatially corresponds to blocked image area 410. As shown, the visual data of non-blocked image 412 depicts the portion of target object 456 that is blocked by blocked image area 410 in temporary image 402.

Referring now back to FIG. 2, at 208 the temporary images are merged into a final image using the selected visual data and excluding the corresponding blocked image area. For example, one of the temporary images is selected. Blocked image areas of the temporary image are replaced with the selected visual data from the corresponding non-blocked image areas extracted from the other temporary image.

For example, referring back to FIG. 4, final image 406, which depicts target object 456 and excludes blocking object 454, is created by replacing blocked image area 410 of temporary image 402 by the spatially corresponding non-blocked image area 412 extracted from temporary image 404.

Referring now back to FIG. 2, at 210, the final image may be forwarded to a controller, for example, a vehicle which includes and/or controls an ADAS, or another controller such as a security controller, a biometric controller, and a surveillance controller.

At 212, in response to receiving the final image, the controller may analyze the image, and/or performs an action.

Exemplary actions by a vehicle controller include: automatic braking, automatic steering, automatic navigation, automatic acceleration, automatic change in speed, generates an alert message, and updating of a heads up display.

Exemplary actions by another controller (e.g., security controller, a biometric controller, and a surveillance controller) include automatic triggering of a security alert, automatic opening of a door, automatic trigger of a surveillance robot, and the like.

At 214, one or more features described with reference to 204-212 are iterated over time, for example, for monitoring the road ahead while the vehicle is driving, for real time navigation of an autonomous vehicle, and/or other real time applications while the vehicle is moving.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non limiting fashion.

Inventors performed an experiment to evaluate detection of blocking objects, using at least some embodiments described herein.

Figure 5:
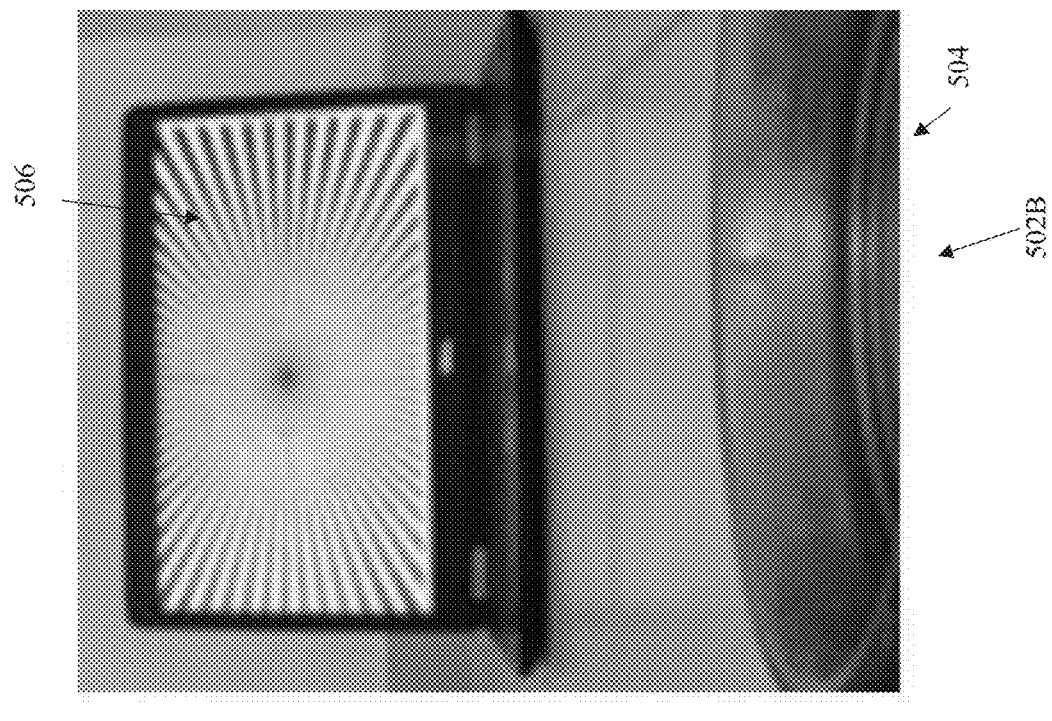
FIG. 5 is a schematic depicting an experiment performed by Inventors to evaluate detection of blocking objects, in accordance with some embodiments of the present invention.
Figure 5:
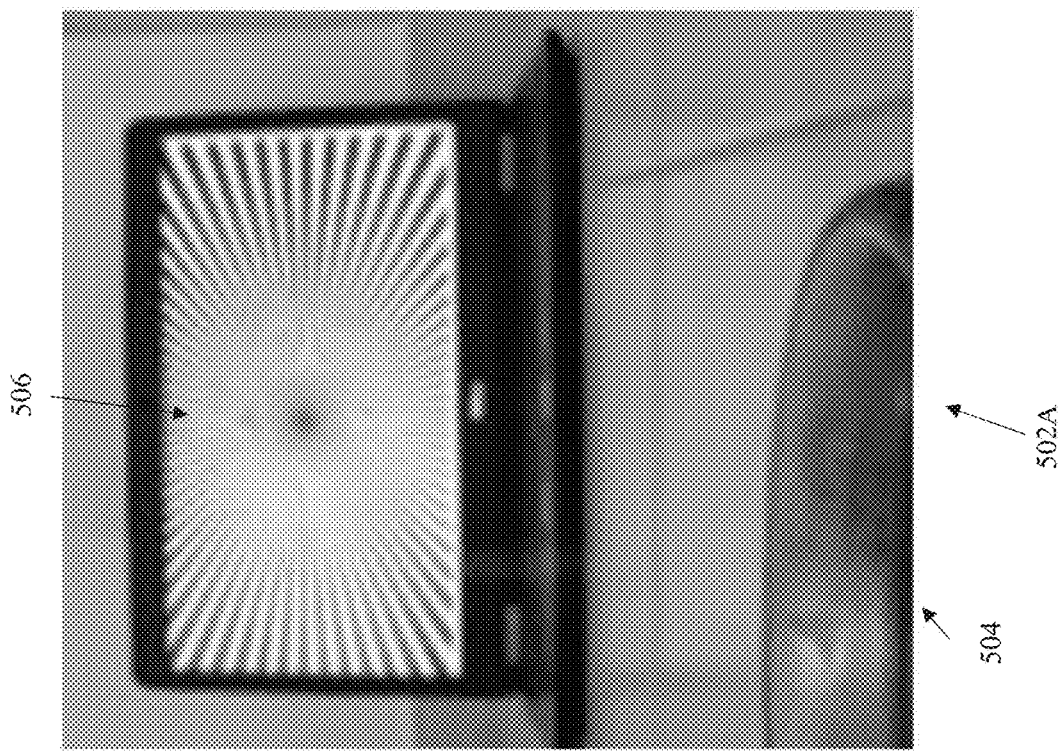

Referring now back to FIG. 5, temporary image 502A is captured by a first video camera, and temporary image 502B is captured by a second video camera spaced apart from the first video camera. A laptop screen 506 simulates desired background, for example, a road ahead from a moving vehicle, which is to be analyzed by the vehicle controller, such as for use by the ADAS. Water drops falling into a container 504 simulate rain.

Figure 6:
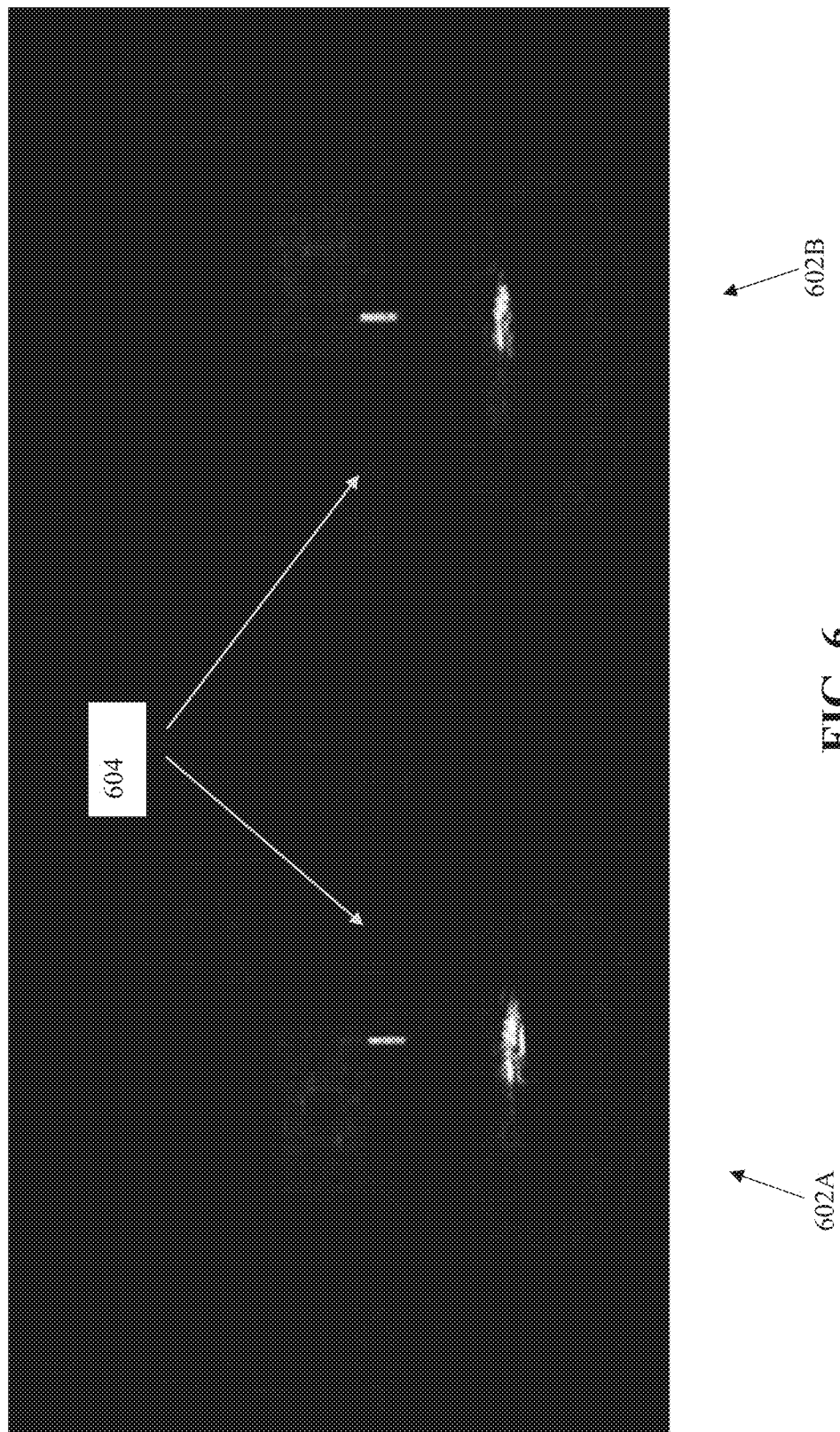
FIG. 6 is another schematic depicting an experiment performed by Inventors to evaluate detection of blocking objects, in accordance with some embodiments of the present invention.

Referring now back to FIG. 6, processed image 602A is computed from temporary image 502A, and processed image 602B is computed from temporary image 502B. Processed images 602A-B depict detected water drops 604 as streaks falling into container 504. The detected moving water drops 604 are represented by a pixel luminosity that is higher relative to the stationary background show in black. Processed images 602A and 602B may be generated by an implementation for detection of moving objects, as described herein.

Figure 7:
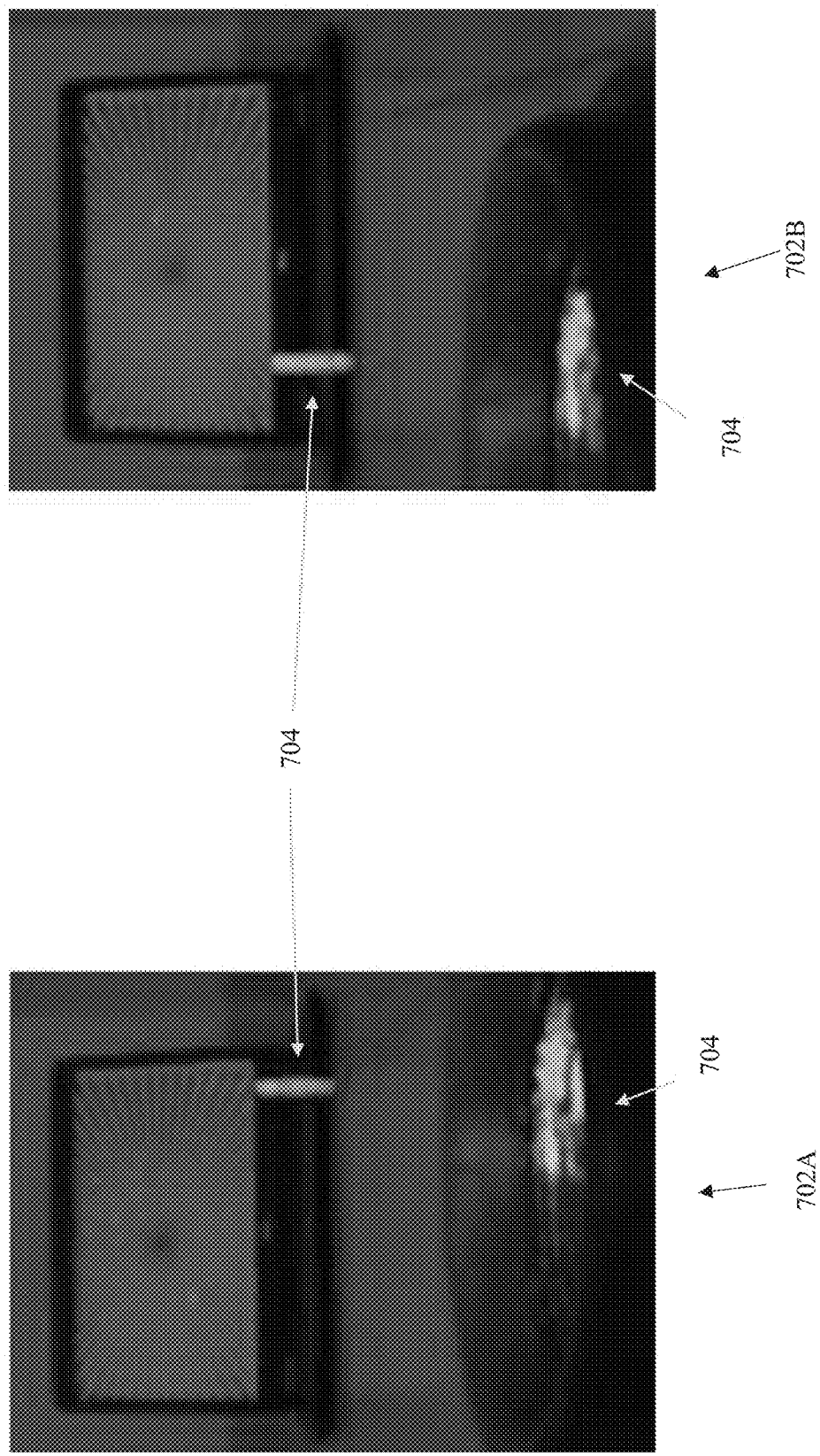
FIG. 7 is yet another schematic depicting an experiment performed by Inventors to evaluate detection of blocking objects, in accordance with some embodiments of the present invention.

Referring now back to FIG. 7, overlay image 702A is computed as an overlay of processed image 602A on temporary image 502A, using a false color. Overlay image 702B is computed as an overlay of processed image 602B on temporary image 502B, using a false color. Water drops 704 corresponding to water drops 604 of FIG. 6 are shown. It is noted that there is significant parallax of water drop 704 depicted in overlay images 702A and 702B, enabling identification of the water drops, removal of the water drops, and use of corresponding non-blocked regions of the background to create a final image that excludes water drops, as described herein. It is noted that there is a non-significant parallax of the laptop screen.

Figure 8:
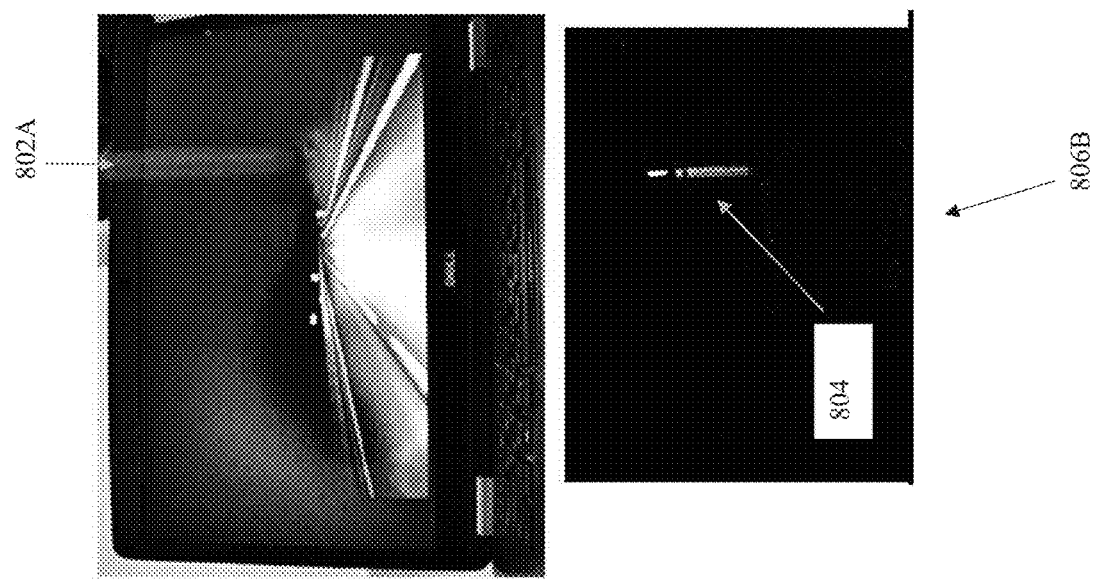
FIG. 8 is yet another schematic depicting an experiment performed by Inventors to evaluate detection of blocking objects, in accordance with some embodiments of the present invention.
Figure 8:
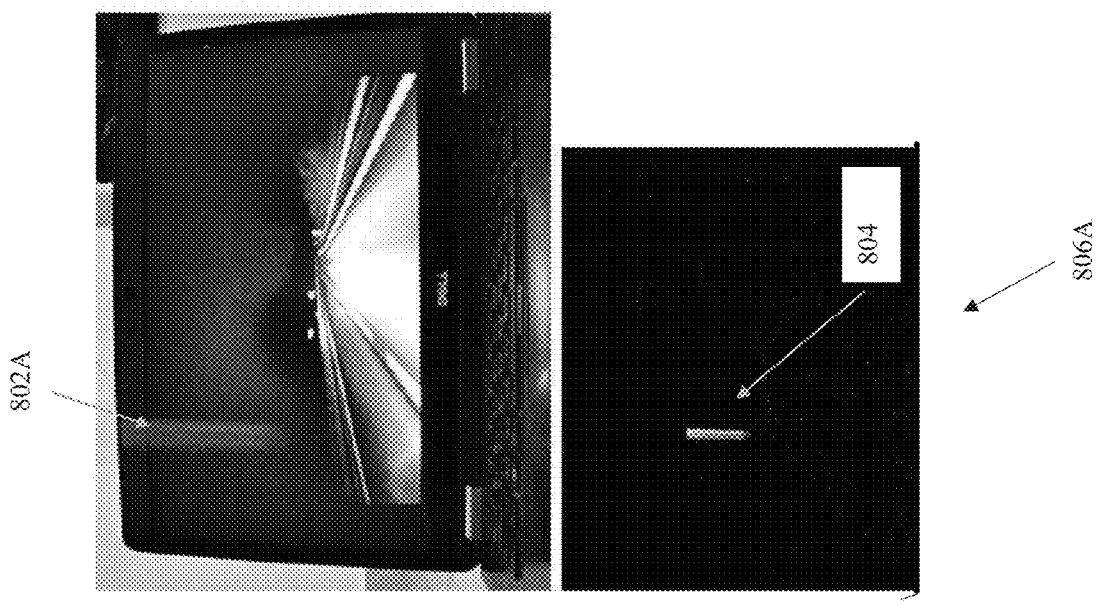

Referring now back to FIG. 8, the scene of the road while the vehicle is moving is captured in temporary images 802A and 802B by respective sensors, without significant parallax. Dripping water 804 is depicted in different locations in processed image 806A computed from temporary image 802A and in processed image 806B computed from temporary image 802B, due to parallax between the sensors for close objects, as described herein.

Figure 9:
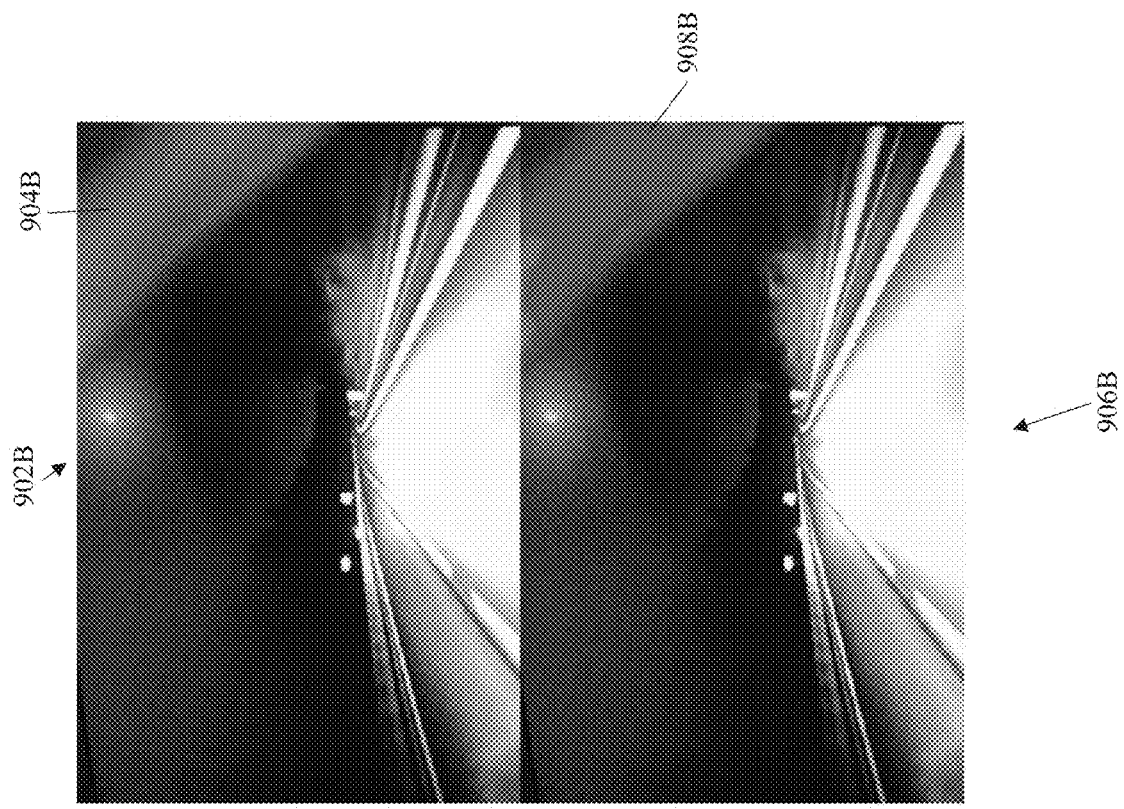
FIG. 9 is yet another schematic depicting an experiment performed by Inventors to evaluate detection of blocking objects, in accordance with some embodiments of the present invention.
Figure 9:
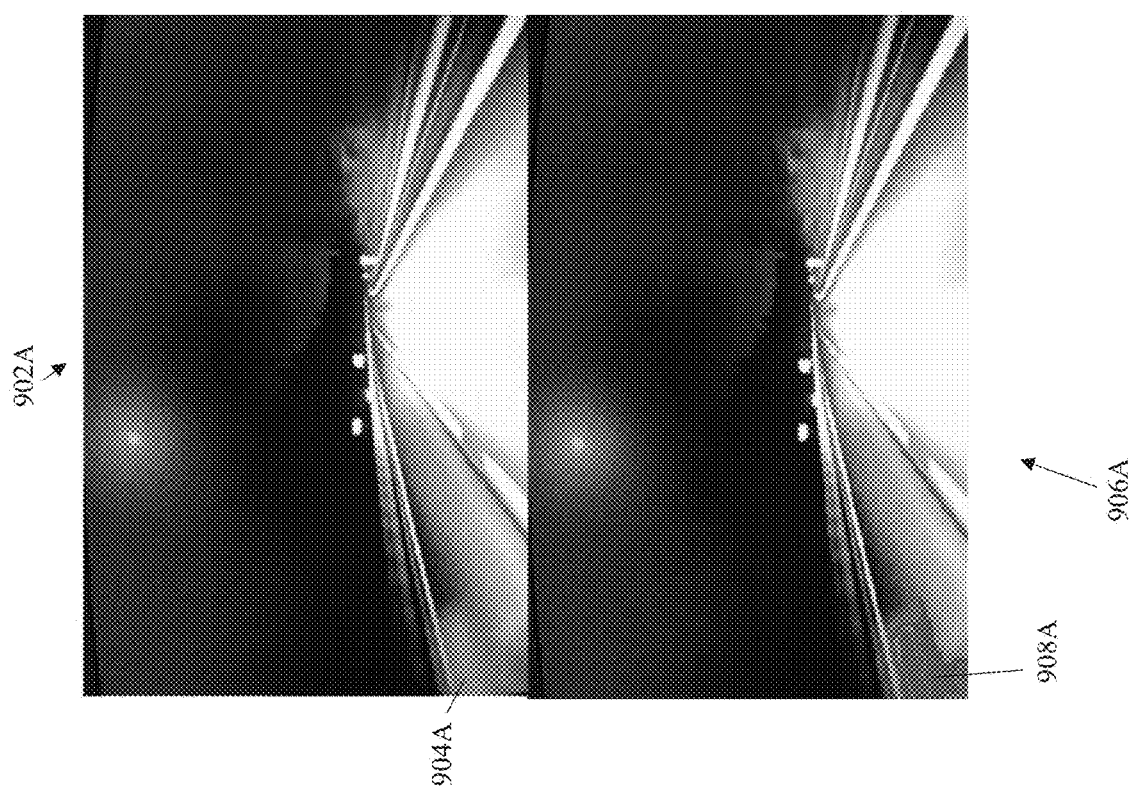

Referring now back to FIG. 9, temporary image 902A captured by a first sensor depicts a stationary blocking image region 904A created from a smudge of water/dirt/mud. Temporary image 902B captured by a second sensor depicts another stationary blocking image region 904B created from another smudge of water/dirt/mud. Schematic 906A depicts an identification 908A (shown as a darkening of pixels) of blocking image region 904A, using approaches described herein. Schematic 906B depicts an identification 908B (shown as a darkening of pixels) of blocking image region 904B, using approaches described herein. The final image that excludes the identified blocking image regions of temporary images 902A-B and includes the spatially corresponding non-blocking image regions of each other respective temporary image, is created as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sensors will be developed and the scope of the term sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A vehicle sensor system, comprising:
   a plurality of sensors with mostly overlapping field of views that simultaneously acquire temporary images;
   a processing circuitry that:
   analyzes the temporary images to identify at least one blocked image area in at least one temporary image of the plurality of temporary images which is less or not blocked in at least one spatially corresponding image area of at least one other temporary image of the plurality of temporary images, wherein identifying said at least one blocked image area is conducted by:
  accessing a dataset that maps between pixels of a first sensor and corresponding field-of-view corrected pixels in a second sensor, that depict a same region of the overlapping field of views,
  computing, for the first sensor, a first difference between a first image patch around a first pixel(s) of the temporary image acquired by the first sensor, and a corresponding first image patch around the first pixel(s) of at least one preceding temporary image acquired by the first sensor,
  computing, for the second sensor, a second difference between a second image patch around the FOV corrected pixel(s) of the temporary image acquired by the second sensor corresponding to the first pixel(s) of the temporary image acquired by the first sensor, and a corresponding second image patch around the FOV corrected pixel(s) of at least one preceding temporary image acquired by the second sensor, and
  when the first difference and the second difference are substantially different, identifying at least one blocked image area as the first image patch or the second image patch;
  selects visual data from the at least one spatially corresponding image areas over corresponding visual data from the at least one blocked images area,
  merges the plurality of temporary images into a final image using the selected visual data and excludes the at least one blocked image area; and
an output interface that forwards the final image to a vehicle controller.

2. The vehicle sensor of claim 1, wherein at least one of: (i) the corresponding first image patch and corresponding second image patch, and (ii) the first image patch and the second image patch, are computed by applying a compensation for motion of the vehicle and/or motion of the sensor.

3. The vehicle sensor of claim 2, wherein the identified at least one blocked image area comprises at least one moving object that moves independently with respect to the moving vehicle and/or sensors.

4. The vehicle sensory system according to claim 3, wherein identifying the at least one blocked image area comprises identifying the at least one blocked image area as the first image patch when the first difference is larger, or identifying the at least one blocked image area as the second image patch when the second difference is larger.

5. The vehicle sensor of claim 1, wherein the at least one blocked image area is identified when at least one of the first difference and the second difference is maintained for at least a threshold number of frames.

6. The vehicle sensor system according to claim 5, wherein the at least one blocked image area comprises an object that is stationary with respect to motion of the vehicle.

7. The vehicle sensor system according to claim 6, wherein the object that is stationary with respect to motion of the vehicle is located on at least one of: (i) one of the sensors, and (ii) a windshield of the vehicle when the sensors are installed in an interior of the vehicle.

8. The vehicle sensor system according to claim 6, wherein identifying the at least one blocked image area comprises identifying the at least one blocked image area as the first image patch when recent historical values of the first difference have become smaller over time and/or when a current value of the first difference is significantly different from at least one recent historical value of the first difference, or identifying the at least one blocked image area as the second image patch when recent historical values of the second difference have become smaller over time and/or when a current value of the second difference is significantly different from at least one recent historical value of the second difference.

9. The vehicle sensor of claim 1, wherein the first difference is computed by a first cross correlation between the first image patch and the corresponding first image patch, and the second difference is computed by a second cross correlation between the second image patch and the corresponding second image patch.

10. The vehicle sensor system according to claim 1, wherein at least one of the first difference and the second difference is selected from a group consisting of: a change in pixel luminosity, and a change in pixel sharpness.

11. The vehicle sensor system according to claim 1, further comprising feeding at least the at least one blocked image area into a trained machine learning model for verifying that the at least one blocked image area is due to undesired objects and not due to significant objects.

12. The vehicle sensor system according to claim 1, wherein the vehicle controller comprises an ADAS.

13. The vehicle sensor system according to claim 1, wherein in response to receiving the final image, the vehicle controller performs at least one of: automatic braking, automatic steering, automatic navigation, automatic acceleration, automatic change in speed, generates an alert message, and updating of a heads up display.

14. The vehicle sensor system according to claim 1, wherein the plurality of sensors are positioned on the vehicle, or within an interior of the vehicle, spaced apart and oriented for providing a significant parallax for undesired objects located on a windshield or in near proximity to the vehicle, the undesired objects depicted as the at least one blocked image area.

15. The vehicle sensor system according to claim 14, wherein the plurality of sensors are spaced apart and orientated for insignificant parallax for target objects located further away from the vehicle that are not depicted as the at least one blocked image area, wherein the final image created by the processing circuitry depicts the target objects and excludes the undesired objects, wherein a distance between any one of the sensors and the target objects is significantly larger than a distance between the sensors.

16. A method for generating an image from a vehicle sensor system, comprising:
  obtaining temporary images from a plurality of sensors with mostly overlapping field of views that simultaneously acquire the temporary images,
  analyzing the temporary images to identify at least one blocked image area in at least one temporary image of the plurality of temporary images which is less or not blocked in at least one spatially corresponding image area of at least one other temporary image of the plurality of temporary images, wherein identifying said at least one blocked image area is conducted by:
    accessing a dataset that maps between pixels of a first sensor and corresponding field-of-view corrected pixels in a second sensor, that depict a same region of the overlapping field of views, computing, for the first sensor, a first difference between a first image patch around a first pixel(s) of the temporary image acquired by the first sensor, and a corresponding first image patch around the first pixel(s) of at least one preceding temporary image acquired by the first sensor, computing, for the second sensor, a second difference between a second image patch around the FOV corrected pixel(s) of the temporary image acquired by the second sensor corresponding to the first pixel(s) of the temporary image acquired by the first sensor, and a corresponding second image patch around the FOV corrected pixel(s) of at least one preceding temporary image acquired by the second sensor, and when the first difference and the second difference are substantially different, identifying at least one blocked image area as the first image patch or the second image patch;

selecting visual data from the at least one spatially corresponding image areas over corresponding visual data from the at least one blocked images area, merging the plurality of temporary images into a final image using the selected visual data and excludes the at least one blocked image area; and forwarding the final image to a vehicle controller.

17. A sensor system, comprising:

a plurality of sensors with mostly overlapping field of views that simultaneously acquire temporary images;

a processing circuitry that:

analyzes the temporary images to identify at least one blocked image area in at least one temporary image of the plurality of temporary images which is less or not blocked in at least one spatially corresponding image area of at least one other temporary image of the plurality of temporary images, wherein identifying said at least one blocked image area is conducted by:

accessing a dataset that maps between pixels of a first sensor and corresponding field-of-view corrected pixels in a second sensor, that depict a same region of the overlapping field of views, computing, for the first sensor, a first difference between a first image patch around a first pixel(s) of the temporary image acquired by the first sensor, and a corresponding first image patch around the first pixel(s) of at least one preceding temporary image acquired by the first sensor, computing, for the second sensor, a second difference between a second image patch around the FOV corrected pixel(s) of the temporary image acquired by the second sensor corresponding to the first pixel(s) of the temporary image acquired by the first sensor, and a corresponding second image patch around the FOV corrected pixel(s) of at least one preceding temporary image acquired by the second sensor, and when the first difference and the second difference are substantially different, identifying at least one blocked image area as the first image patch or the second image patch;

selects visual data from the at least one spatially corresponding image areas over corresponding visual data from the at least one blocked images area, merges the plurality of temporary images into a final image using the selected visual data and excludes the at least one blocked image area; and an output interface that forwards the final image to a controller selected from a group comprising: surveillance, biometric, and security.

* * * * *